United States Patent [19]

Beier et al.

[11] Patent Number: 4,893,960
[45] Date of Patent: Jan. 16, 1990

[54] WHEEL BEARING/CONSTANT VELOCITY JOINT UNIT

[75] Inventors: Rudolf Beier, Offenbach am Main; Hans-Heinrich Welschof, Rodenbach, both of Fed. Rep. of Germany

[73] Assignee: Lohr & Bromkamp GmbH, Offenbach am Main, Fed. Rep. of Germany

[21] Appl. No.: 113,008

[22] Filed: Oct. 26, 1987

[30] Foreign Application Priority Data

Oct. 24, 1986 [DE] Fed. Rep. of Germany ....... 3636243

[51] Int. Cl.⁴ ................................................. F16B 1/00
[52] U.S. Cl. ...................................... 403/24; 403/261; 403/274; 403/380
[58] Field of Search ............... 403/260, 261, 380, 274, 403/282, 277, 24; 29/148.4 A

[56] References Cited

U.S. PATENT DOCUMENTS

| | | | |
|---|---|---|---|
| 3,586,357 | 6/1971 | Orain | 403/380 |
| 4,125,298 | 11/1978 | Heurich et al. | 403/274 X |
| 4,433,932 | 2/1984 | Brandenstein | 403/261 |
| 4,486,940 | 12/1984 | Valori | 403/274 X |

FOREIGN PATENT DOCUMENTS

| | | | |
|---|---|---|---|
| 1931300 | 1/1970 | Fed. Rep. of Germany. | |
| 3116720 | 10/1982 | Fed. Rep. of Germany. | |
| 3132442 | 2/1983 | Fed. Rep. of Germany. | |
| 2539678 | 7/1984 | Fed. Rep. of Germany. | |
| 3418440 | 11/1985 | Fed. Rep. of Germany. | |
| 1297368 | 11/1972 | United Kingdom | 403/260 |
| 2129096 | 5/1984 | United Kingdom | 403/27 |

Primary Examiner—Andrew V. Kundrat
Attorney, Agent, or Firm—Toren, McGeady & Associates

[57] ABSTRACT

The invention relates to a wheel bearing/constant velocity joint unit having a double row bearing 2 which has been provided with at least one inner bearing ring 12 which is separate from the wheel hub 1. The wheel hub and the outer part of the constant velocity joint are form-fittingly and non-rotatingly connected to each other by spur teeth. The spur teeth at the wheel hub are preferably produced by orbital pressing or orbital forging, and while the forming process takes place a collar is produced at the wheel hub which serves for axially tensioning the inner bearing rings, at least the one of the joint end.

7 Claims, 3 Drawing Sheets

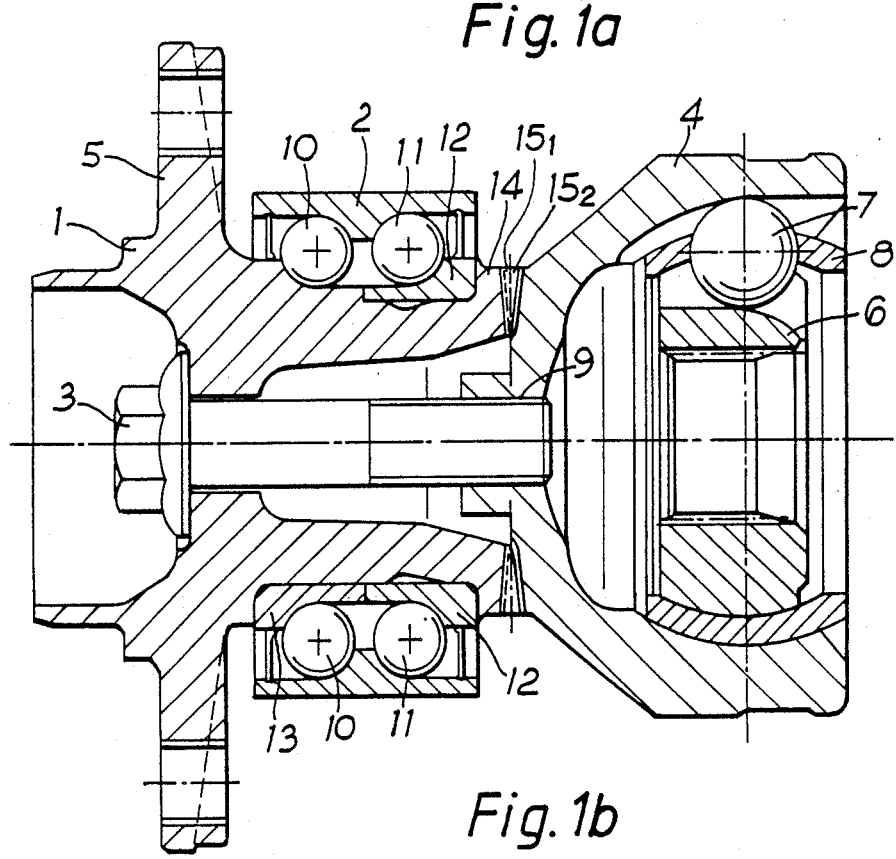
Fig. 1a
Fig. 1b
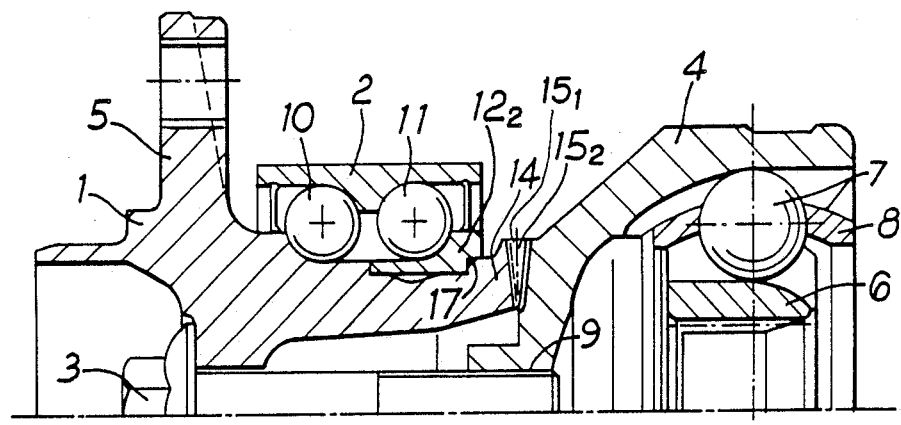
Fig. 1c

WHEEL BEARING/CONSTANT VELOCITY JOINT UNIT

BACKGROUND OF THE INVENTION

The present invention relates to a wheel bearing/constant velocity joint unit with a double row bearing which has been provided with at least one inner bearing ring which is separate from the wheel hub and which is axially held or tensioned by a formed collar provided at the wheel hub. The collar may be provided directly or indirectly via an intermediate part for holding the inner bearing ring. As a forming process, cold forming is particularly suitable.

Bearings of the above-mentioned type are known in the case of which the double row bearing comprises a separate inner bearing ring, which means that the bearing may be filled with a larger number of balls and that a radially compact design can be achieved (DE 34 18 440 A 1). Without having to carry out considerable modifications it would also be possible to use two separate inner bearing rings, thereby offering the same advantages in respect of the load bearing capacity of the bearing. The transmission of torque from the wheel hub to the adjoining joint is effected through longitudinal teeth inside the hub into which an attached shaft journal of the joint outer part may be introduced. Due to production-related tolerance fluctuations and wear in the longitudinal teeth, a clearance-free transmission of the driving torque cannot always and continuously be ensured, thereby causing noise and an increasing amount of wear in the joined areas. Because the collar engages the inner end groove of the outer bearing ring for tensioning purposes, it is not possible to introduce suitable solutions for the transmission of torque.

There are further prior art wheel bearing/joint connections in the case of which the transmission of torque between the wheel hub and the joint is achieved in an essentially clearance-free way by spur teeth or helical teeth on both parts (DE 32 19 747 A 1). However, this solution definitely requires bearings of the so-called third generation in the case of which the inner bearing rings are integral with the wheel hub. There is no other way of achieving an undivided end face of the wheel hub, the disadvantage of this design being that only a bearing type with a small number of balls can be used. The radial assembly space required for the bearing is correspondingly larger, and at the same time weight disadvantages have to be accepted. Even in this case, the outer diameter of the teeth is limited by the end-face outer diameter of the inner bearing ring, i.e. of the wheel hub in this case, which, for assembly reasons, cannot be increased by just any amount.

SUMMARY OF THE INVENTION

It is therefore the object of the invention to provide a wheel bearing/joint unit which, while using at least one separate inner bearing ring in order to achieve a lightweight bearing unit with high load bearing factors permits a clearance-free transmission of torque from the wheel hub to the constant velocity joint by means of spur or helical teeth. Independently of the bearing size, the object is to adapt the diameter of the teeth to the required torque capacity.

The first solution consists in spur or helical teeth being formed into the formed collar of the wheel hub covering the inner bearing ring radially outwardly, which are directly and non-rotatingly connectable to one joint component, especially the joint outer part. Such a design in accordance with the invention makes it possible to provide large-area, radially orientated spur teeth or slightly conical helical teeth, independently of the kind of bearing design, and with the help of a suitable process in accordance with the invention, the spur or helical teeth are impressed into the material while the collar is being produced.

A further solution consists in helical or spur teeth having been provided on an annular projection increasing the size of the inner bearing ring radially outwardly, which teeth are directly and non-rotatingly connectable to one joint component, especially the outer joint part, with the inner bearing ring having preformed engaging means which are engaged by the formed collar in a form-fitting way. With this design, the front separate inner bearing ring which may be completely redesigned and provided with an increased end face participates in the transmission of torque from the hub to the joint. In this case, the critical connection to the joint is effected via large spur or helical teeth, whereas a secure non-rotating connection between the inner bearing ring and the hub, in an embodiment in accordance with the invention, is also effected in a form-fitting way, and in a forming process of the invention the hub is formed into correspondingly prepared recesses in the inner bearing ring while the collar is being produced.

A third solution consists in helical or spur teeth having been provided on an intermediate ring which is separate from the inner bearing ring and from the wheel hub and covers the inner bearing ring radially outwardly, with such teeth being directly and non-rotatingly connectable to one joint component, especially the outer joint part, and with the intermediate ring having preformed engaging means which are engaged by the collar in a form-fitting way. With this design, provision has been made for a freely designable intermediate ring, again with a sufficiently large end face, for effecting the connection with the joint via spur or helical teeth, which, in accordance with the invention, is form-fittingly connected to the collar at the hub. In this case, the power flow takes place from the hub via the intermediate ring to the joint, with the separate inner bearing ring being axially held directly by the collar without participating in the transmission of torque. In this case, too, a process in accordance with the invention ensures that the form-fitting connection to the intermediate ring is effected simultaneously with the production of the collar, with the material engaging in correspondingly pre-produced engaging means at the intermediate ring.

In a preferred embodiment, the engaging means at the inner bearing ring provided with spur teeth or at the intermediate ring may, in turn, be designed as teeth, with both the longitudinal teeth and the spur teeth being suitable for being arranged in different ways.

However, it is also possible to provide easier-to-produce coarser engaging means in small numbers. Due to the fact that in the region of the collar, the material, in the course of the forming process and especially by cold-forming, is pressed into these engaging means, there remains in the material a high degree of elastic pretension which prevents unfastening or slackening of the connection, even under load. This also applies to cases where the engaging means are designed as longitudinal teeth.

The process in accordance with the invention is characterised in that, in one operation, for tensioning the inner bearing ring, the collar is expanded and radial spur teeth are formed into it, and at the same time it is form-fittingly connected to the inner bearing ring provided with the pre-produced spur teeth or to an intermediate ring comprising pre-produced spur teeth. This is done to reduce the forces required, especially by means of a cylindrical or conical tool orbiting around the hub axis and having corresponding spur teeth faces or annular steps to press into the collar the final shape required. The tools suitable for the process may consist of axially movable elements which are concentric relative to each other and which are preferably axially supported against each other in a spring-suspended way, with special preference being given to those elements which support the inner bearing ring axially or even radially outwardly in order to prevent deformation during the forming process or even permanent deformation or impermissible radial stresses in the bearing ring. Embodiments of the elements in accordance with the invention as well as examples of suitable tools explaining the process are illustrated in the following drawings wherein.

BRIEF DESCRIPTION OF THE DRAWING

FIG. 1a and 1b show a first embodiment of a unit with spur teeth pressed on to the collar to produce a direct connection with the outer joint part.

FIG. 1c shows a second embodiment of a unit with spur teeth pressed on to the collar to produce a direct connection with the joint outer part.

DETAILED DESCRIPTION OF THE INVENTION

Figure 2:
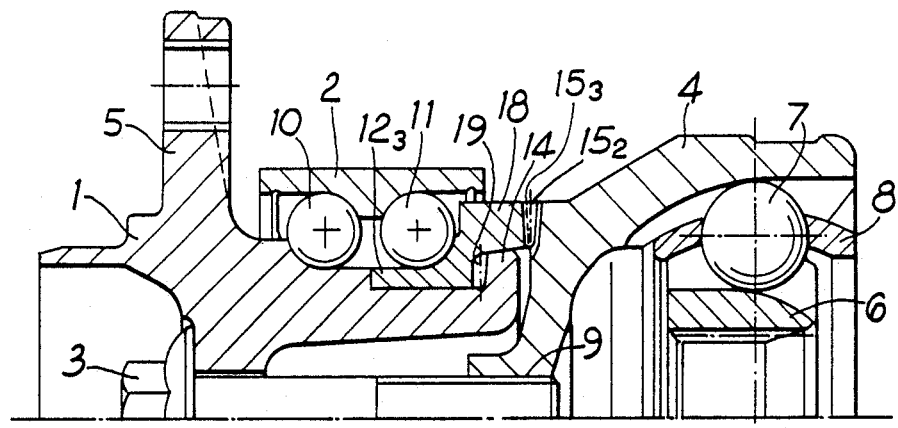
FIG. 2 illustrates an element with spur teeth at the inner bearing ring, with the collar engaging in a form-fitting way at the bearing ring.

In the Figures which largely correspond to each other, corresponding parts have been given the same reference numbers. FIGS. 1 to 4 show the wheel hub 1 with the bearing 2 tensioned via an axial bolt 3 to the joint outer part 4. The wheel flange 5 has been formed on to the wheel hub in the usual way, and the outer joint part 4, in the usual way, accommodates the inner joint part 6 to which it is non-rotatingly connected via balls 7 held in a cage 8. The outer joint part has been provided with a central bore which is engaged by the threaded bolt 9.

In FIG. 1a, the ball row 10 is guided directly in a groove in the hub member 1 whereas the ball row 11 at the joint end has been provided with a separate inner bearing ring 12. In contrast, FIG. 16 shows that a further separate inner bearing ring 13 has also been provided for the ball row 10 at the wheel end. The bearing ring 12 is held by a collar 14 formed on to the hub 1 so as to be integral with it and at its end face containing spur teeth $15_1$ cooperating with corresponding spur teeth $15_2$ at the joint outer part 4. Within the hub 1 inwardly of the inner bearing 12 there is an annular space 16 which may remain when forming the collar 14.

FIG. 1c, illustrating essentially the same design as FIG. 1a, shows the inner bearing ring $12_2$ with an inner broken out region 17 at the end face into which the material of the collar 14 presses itself during forming.

In FIG. 2, the inner bearing ring $12_3$, towards its end face, on an increased diameter, has been provided with an annular projection 18 at whose end face spur teeth $15_3$ have been worked out which engage the corresponding spur teeth $15_2$ at the joint outer part 4. Furthermore, at the inner bearing ring $12_3$, on an inner step within the annular projection 18 directed towards the joint, spur teeth 19 have been formed into which the material of the collar 14 which covers the inner bearing ring $12_3$ at the end face as far as the step is pressed.

Figure 3:
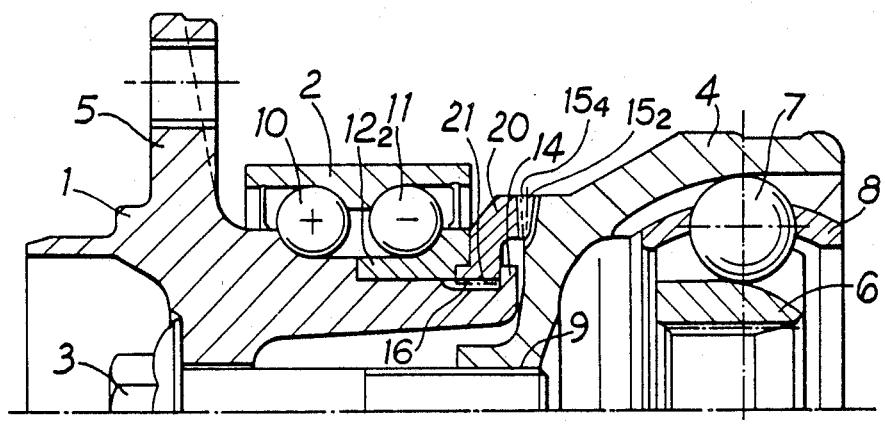
FIG. 3 illustrates an element with spur teeth at the inner bearing ring, with the collar engaging into longitudinal teeth at the element.

In FIG. 3, the inner bearing ring $12_2$, at the end face, again has been provided with an inner edge recess 16 into which an additional intermediate ring 20 extends with a corresponding projection. The intermediate ring 20 with an angular cross-section has been provided with spur teeth $15_4$ tensioned to corresponding spur teeth $15_2$ at the joint outer part 4. The intermediate ring 20 is again held by the collar 14 which, in consequence, indirectly, via the intermediate ring 20, axially holds the inner bearing ring $12_2$. Inside the intermediate ring 20 provision has been made for longitudinal or axially extending teeth 21 into which, in the course of forming the collar, the material in the region of the collar 14 is pressed to produce a form-fitting connection.

Figure 4:
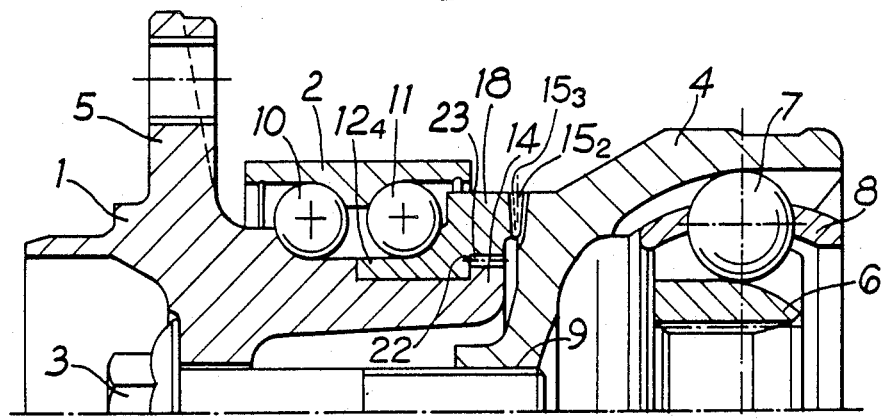
FIG. 4 displays the inner bearing ring with spur teeth engaging the collar and with other spur teeth engaging the outer joint part.

In FIG. 4, the inner bearing ring $12_4$ has again been provided with an annular projection 18 which at its end face comprises teeth $15_3$ cooperating with corresponding spur teeth $15_2$ of the joint outer member. In the region of the collar 14 the annular inner bearing ring $12_4$ comprises a step with inner teeth 23 into which the material of the collar is pressed in the course of the forming process so that a direct non-rotating connection is produced between the inner bearing ring $12_4$ and the hub member 1 whereas at the same time the collar 14 axially tensions the inner bearing ring at a corresponding end face 22.

Figure 5:
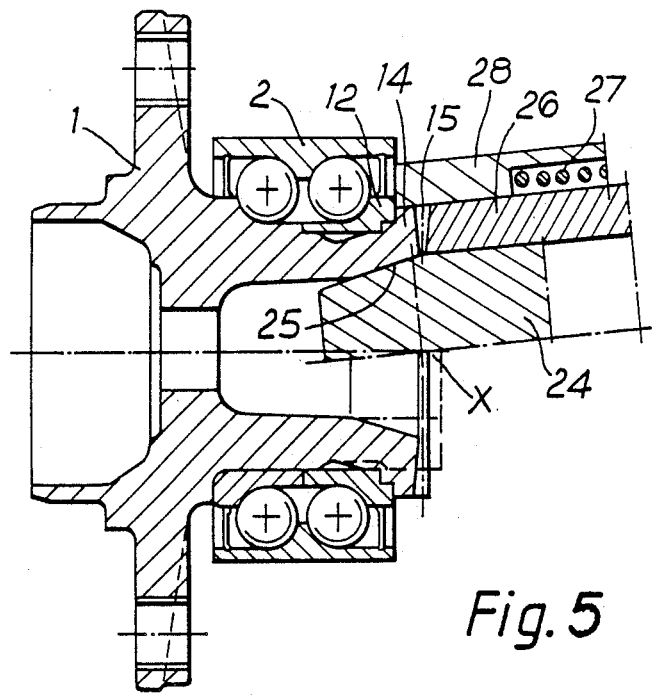
FIG. 5 shows a first tool for forming the hub while forming spur teeth into the collar.

FIG. 5 shows the hub member 1 together with the inner bearing ring 12 similar to FIG. 1b in the final production stage of the collar 14. The tool used for production purposes comprises a central mandrel 24 with a conical end region 25 which carries out an orbiting movement essentially around the point of intersection X of the longitudinal axes of the hub and the tool. As a result, the originally undercut-free hub is itself expanded conically with the object of forming the collar 14 and tensioning the inner bearing ring 12. A sleeve 26 is guided on the mandrel 24. Relative to the axis of the mandrel the sleeve 26 can be moved axially and at its end region, taking into account the orbiting angle, provision has been made for a pressing tool to produce the spur teeth 15. This sleeve 26 can be moved in while the expansion process for the collar is taking place. A further sleeve 28 which is axially independently movable and supported via indicated springs 27 surrounds the sleeve 26 and with its inner face provides a stop for the collar in the radial direction, thereby preventing excessive material flow and limiting the forming process.

Figure 6:
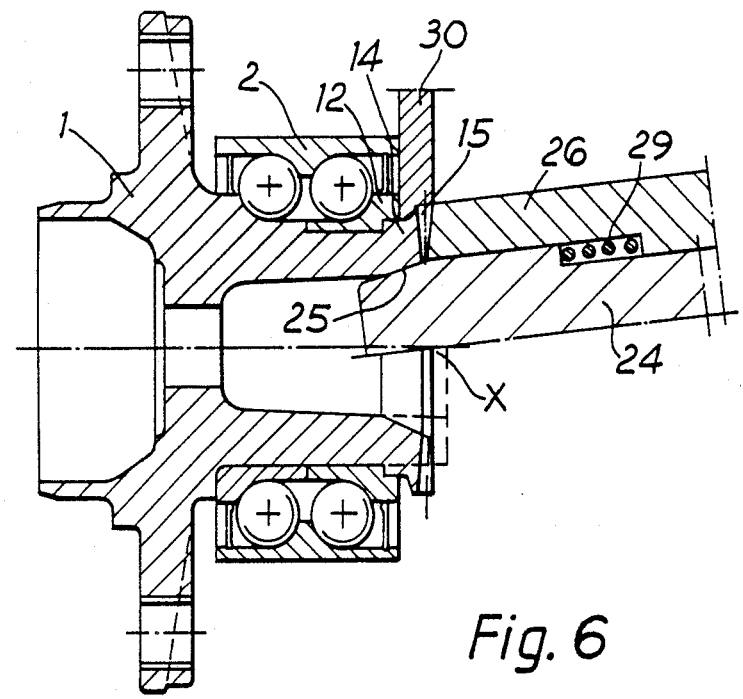
FIG. 6 shows a second tool for forming the hub while forming spur teeth into the collar.

FIG. 6 essentially shows a similar tool with a mandrel 24 having a conical end region 25 on which, supported by springs 29, the sleeve 26 can be moved in an axially controlled way. In this case, too, the sleeve 26 is provided at the end face with a tool for pressing the spur teeth 15 at the collar 14. Instead of the further sleeve as shown in FIG. 5, FIG. 6 shows a radially divided tool 30 providing the radial limits for forming the collar. This tool also limits the expansion of the bearing ring 12. The tool 30 may also be designed in such a way as to be radially movable in a sector-like way, thereby directly embracing the inner bearing ring with suitable claws or the like and radially supporting it against expansion.

Instead of the tool illustrated, it is of course also possible to use similarly operating pressing tools which can be moved only axially, but these produce higher forming forces.

We claim:

1. A wheel bearing/constant velocity joint unit with a constant velocity joint, a double row bearing (2) provided with at least one inner bearing ring (12) separate from a wheel hub (1) and said inner bearing ring is axially held or tensioned by a formed collar (14) on the wheel hub (1), wherein the improvement comprises that said collar extends radially outward at least partially coextensive with and in contact with said inner bearing ring, spur or helical teeth (15) are formed into the formed collar (14) of the wheel hub (1) in the region at least partially coextensive with the inner bearing ring (12), and said spur or helical teeth are directly and non-rotatingly connectable to one joint component (4) of said constant velocity joint.

2. A wheel bearing/constant velocity joint unit with a constant velocity joint, a double row bearing (2) provided with at least one inner bearing ring (12) separate from a wheel hub (1) and said inner bearing ring is axially held or tensioned by a formed collar (14) on the wheel hub (1), wherein the improvement comprises that said collar extends radially outwardly at least partially coextensive with and in contact with said inner bearing ring, helical or spur teeth ($15_3$) provided on an annular projection (18) extending radially outwardly from the inner bearing ring, said helical or spur teeth are directly and non-rotatingly connectable to one joint component of said constant velocity joint, with the inner bearing ring (12) having preformed engaging means engaged by the formed collar (14) in a form-fitting way.

3. A wheel bearing/constant velocity joint unit with a constant velocity joint, a double row bearing (2) provided with at least one inner bearing ring (12) separate from a wheel hub (1) and said inner bearing ring is axially held or tensioned by a formed collar (14) on the wheel hub (1), wherein the improvement comprises that said collar extends radially outwardly at least partially coextensive with said inner bearing ring, helical or spur teeth (15) provided on an intermediate ring (20) which is separate from the inner bearing ring (12) and from the wheel hub (1) and extends radially outwardly from said hub at least partially coextensive with the inner bearing ring (12), the helical or spur teeth (15) being directly and non-rotatingly connectable to one joint component of said constant velocity joint, and the intermediate ring (20) having preformed engaging means (21) engaged by the collar in a form-fitting way.

4. A wheel bearing/constant velocity joint unit according to claim 2, wherein the engaging means at the inner bearing ring (12) are additional spur teeth (19) positioned radially inwardly from the spur teeth ($15_3$) for the purpose of engaging the outer joint part (4).

5. A wheel bearing/constant velocity joint unit according to claim 2, wherein the engaging means at the inner bearing ring (12) are axially extending inner teeth (23) positioned radially inwardly of said spur teeth ($15_3$) for the purpose of engaging the joint outer part (4).

6. A wheel bearing/constant velocity joint unit according to claim 3, wherein the engaging means at the intermediate ring (20) are axially extending inner teeth (21) positioned radially inwardly of said spur teeth ($15_4$) in engagement with the joint outer part (4).

7. A wheel bearing/constant velocity joint unit according to claim 6, wherein the engaging means at the intermediate ring (20) are additional spur teeth.

* * * * *